United States Patent
Dickey, Jr. et al.

[11] Patent Number: 6,166,689
[45] Date of Patent: Dec. 26, 2000

[54] ADAPTIVE BEAMFORMER WITH BEAM MAINLOBE MAINTENANCE

[75] Inventors: Frank R. Dickey, Jr., Dewitt; Judson J. Gostin, Manlius; Gene P Hammel, Liverpool; Kalevi Hoobert Huhta, Syracuse; Ayhan M. Vural, Dewitt, all of N.Y.

[73] Assignee: Lockheed Martin Corporation, Bethesda, Md.

[21] Appl. No.: 05/063,113

[22] Filed: Aug. 12, 1970

[51] Int. Cl.$^7$ ................................. G01S 3/16; H01Q 3/22
[52] U.S. Cl. ............................................. 342/381; 342/371
[58] Field of Search ...................... 343/100 SA, 100 LE; 340/6 R; 342/371, 381, 368, 372, 379

[56] References Cited

U.S. PATENT DOCUMENTS 3,202,991  8/1965  Howells ............................. 343/100 SA
3,500,303  3/1970  Johnson ................................... 340/6 R

OTHER PUBLICATIONS

Widrow et al, "Adaptive Antenna Systems", Proc. of IEEE, vol. 55 No. 12, Dec. 1967, pp 2143–2159.

*Primary Examiner*—Stephen C. Buczinski
*Attorney, Agent, or Firm*—John J. Morrissey; Paul Checkovich

[57] ABSTRACT

An adaptive beamformer and signal processor for sonar and other signal receptor arrays, in which beamforming is accomplished by correlation feedback loops providing matched weighting across the array. To constrain the adaptive beamformer thus comprised against cancellation of useful signals from a particular angular region, which normally is the beam mainlobe or boresight region, one or more spatial notch filters are interposed within the correlation feedback loops for preventing signal suppression within such angular region.

6 Claims, 2 Drawing Sheets

ADAPTIVE BEAMFORMER WITH BEAM MAINLOBE MAINTENANCE

BACKGROUND OF THE INVENTION

This invention relates generally to signal detection in systems utilizing arrayed receptors for acoustic and electromagnetic wave signals as in sonar, radar, communications and seismic wave detection systems. More particularly, the invention relates to the processing of signals as received by such receptor arrays to accomplish array beamforming and to extract useful signal output from signals received in company with noise and interference.

Many reports have appeared in recent literature on efforts to achieve optimal space-time processing of signals in array systems particularly for sonar application, so as to maximize system capabilities to detect useful signals immersed in noise. From these efforts there has evolved an optimal processor concept which is fairly well defined, and which also is narrowly defined in the sense that there is a strong similarity among most if not all of the so-called optimal processors. Generally such processors are composed of a beamformer or spatial processor followed by a filter, and for plane wave signals the beamformer is common to all and only the filter reflects the particular criterion of optimality selected. In all cases the spatial processor or beamformer functions to maximize the detectability of deterministic known signals immersed in gaussion interference, and it accomplishes this through a set of filter functions which achieve a maximized signal-to-interference power density ratio at each frequency. In this sense the beamformer may properly be considered a spatial prewhitener; at each frequency it suppresses peaks in the angular power density function of the noise or interference.

While optimal processors thus display a commonality of concept and basic function, attempts at their implementation have employed a variety of different approaches and experienced varying degrees of success in achieving optimal processing in practical systems. Many practical systems, for example, employ amplitude and phase steering, and arrays thus steered normally are not capable of generating an independent radiation pattern at each frequency as required for the theoretically optimal processor. Another problem arises where the characteristics of the useful signal and the noise do not enable temporal discrimination between them; in such cases it is difficult to accomplish the desired prewhitening without suppression of useful signals along with the noise.

SUMMARY OF THE INVENTION

The present invention is directed to processors of the general kind just described and has as its primary objective the provision of such optimal processors which achieve desired performance even in unknown, complex and time-varying environments, and which do so in realizable implementations characterized by relative simplicity and economy of cost.

In its preferred embodiments as herein described the invention utilizes an adaption of a correlation feedback technique which was originally developed for radar sidelobe cancellation. In accordance with the invention, this technique is applied to provide beamforming and matched weighting of received signals in an amplitude and phase steered array, through feedback of the beam output signals to correlators at the array elements to accomplish the arithmetic functions required for optimized or matched weighting as well as for beamsteering. These correlation feedback loops provide such matched weighting by nulling or cancelling coherent signals incident upon the array, except transient signals of low average energy over the correlator integration time. Thus the beamformer can receive active pulse-like signals with nearly full coherent addition, while suppressing steady interference.

In passive sonar and like systems wherein the useful signals are not pulse-like but rather are essentially continuous and thus not temporally distinguishable from the noise, cancellation of low average energy noise could also result in cancellation of useful signal in the beam mainlobe. Some mechanism is needed, therefore, for preventing cancellation of such boresight signals and for maintenance of the beam mainlobe in their presence, and in accordance with the invention this is accomplished by use of one or more spatial notch filters which inhibit the correlation feedback loops against response to and cancellation of signals arriving from an angular sector about the boresight. The addition of such spatial filters allows a fully adaptive beamformer suitable for use in sonar systems in both active and passive operation, as well as for use in other receptor array systems in which the useful signal is not pulse-like or otherwise temporally distinguishable from the noise.

BRIEF DESCRIPTION OF THE DRAWINGS

The foregoing and other objects, features and advantages of the invention will be more fully understood by reference to the following detailed description when read in conjunction with the accompanying drawings, wherein.

DETAILED DESCRIPTION

Figure 1:
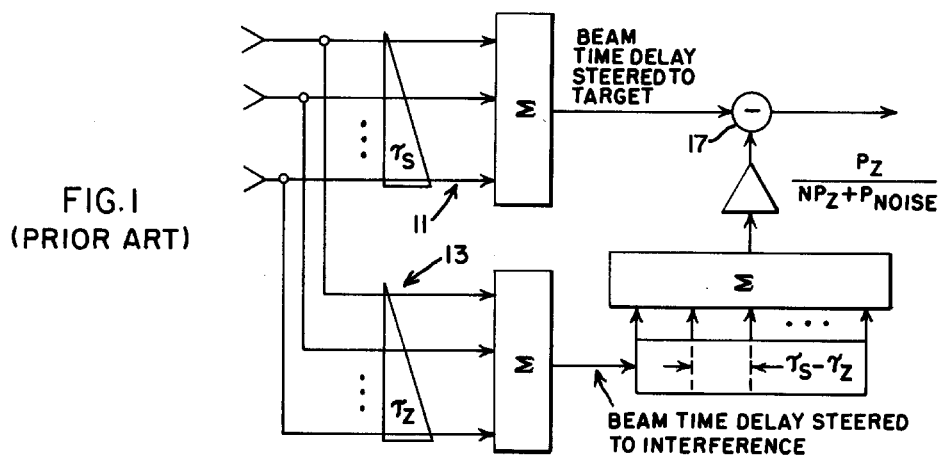
FIG. 1 is a block diagram of an optimal array processor of known and generalized form.

With continued reference to the drawings, wherein like reference numerals have been used throughout to designate like elements, FIG. 1 illustrates an optimal array of elemental and generalized form illustrative of the operation of this general class of processor. The processor as shown may be seen to comprise a combination of two beamformers, including 1) a primary beamformer which functions to time-delay steer the primary beam to the target position, and 2) a perturbation beamformer which functions to time-delay steer an auxiliary beam to the interference source. The output of the perturbation beamformer is passed through a tapped delay line filter 15 which matches the frequency response of both beamformers to the incident interference. The beam outputs then are subtracted at 17 to suppress the interference.

The two beamformers in the array processor of FIG. 1 both have uniform amplitude, linear phase illuminations, and the array effectively generates a radiation pattern at each frequency which has a null at the angle of the interference. The ability of the optimal beamformer thus to generate an independent radiation pattern at each frequency offers a theoretical capability of extreme power and flexibility to array processors of this type.

The realization of this capability is not easily accomplished, however, in practical systems such as phase and amplitude weighted arrays which must operate across a broad band of frequencies. Such practical phased arrays are not capable of generating an independent radiation pattern at each frequency, but rather can generate only a single radiation pattern which must suffice to suppress broadband interference. As a consequence, if a phase and amplitude steered array is to succeed in cancelling such broadband interference, the radiation pattern generated by the array must include one or more angularly extended nulls, to accommodate the apparent spread of radiation even from a point source of broadband interference due to dispersion of receptor-to-receptor phase shifts over the frequency band of the interference.

It is possible to give phase and amplitude weighted arrays the capability to generate radiation patterns with angularly extended nulls, and some systems of this kind can perform so well even against broadband interference that for many applications of practical interest the performance degradation normally associated with amplitude and phase weighting the array signals is not appreciable. As more fully explained hereinafter, this capability may be achieved by making the signal weighting optimal in the sense that it maximizes the ratio of array output peak signal to average interference power. By analogy with temporal processing this optimal illumination function in amplitude and phase steered arrays is referred to as "matched weighting", and expressed in the language of matrix algebra it requires that the matrix of input signals be multiplied by the product of the inverse of the input interference covariance matrix and the matrix of array steering coefficients.

In the embodiments of the present invention particularly described hereinafter, such matched weighting is achieved in readily and economically realizable implementation by use of correlation feedback loops similar to those employed in radar sidelobe cancellers of the kind disclosed in U.S. Pat. No. 3,202,990 to Howells, and in the co-pending application Ser. No. 165,259, filed Jan. 9, 1962, in the names of Sidney P. Applebaum, Paul W. Howells and James C. Kovarik, both patent and application being assigned to the assignee of the present invention.

The cancellers disclosed in these prior cases have found wide application in protecting radars against strong noise-like jamming entering through the sidelobes of the antenna response. As fully explained in the patent and application, such cancellers employ a plurality of omnidirectional antennas which are disposed in close proximity to the main dish or array and have a gain roughly equal to the highest sidelobes of the primary antenna pattern, and which serve as sources of amplitude and phase shifted versions of the interference present in the main receiver. The canceller operates through a plurality of feedback correlation loops to derive amplitude and phase adjustments to each of the auxiliary channel signals, to combine the adjusted signals to form an auxiliary or perturbation beam, and to subtract the auxiliary beam signal from the main channel signal. The automatically derived amplitude and phase adjustments are such that the subtraction yields a cancellation of the main channel sidelobe jamming.

One salient characteristic of sidelobe cancellers of this type is that the closed-loop time constant of the feedback correlation loops is such that the loop lock-on the to low average power waveforms is long, whereas to high average power waveforms it is short. This, in fact, is one means by which the canceller is able to suppress interference but not useful signal. If the interference in the main channel is sufficiently strong to be troublesome even when introduced through the sidelobes, then in the auxiliary channel, with its omnidirectional sensor, it is quite likely to be 10- to 30-db stronger than useful signal. In addition, in most radar applications the useful signal is pulse-like so that its power, averaged over the closed-loop time constant, is very low. The interference, on the other hand, is generally a high duty cycle noise-like wave with a correspondingly high power when averaged over the closed-loop time constant.

The omnis or other auxiliary elements in a multiple sidelobe canceller may be regarded as elements of an auxiliary array. The amplitude and phase weights derived by the canceller constitute the illumination function for such array. By combining the adjusted auxiliary channel signals and then subtracting their sum from the main channel signal the canceller is, in effect, forming an auxiliary or perturbation beam and subtracting it from the primary beam. Multiple interference sources will be cancelled provided the perturbation pattern matches the primary pattern at the angles-of-arrival of the interference.

Figure 2:
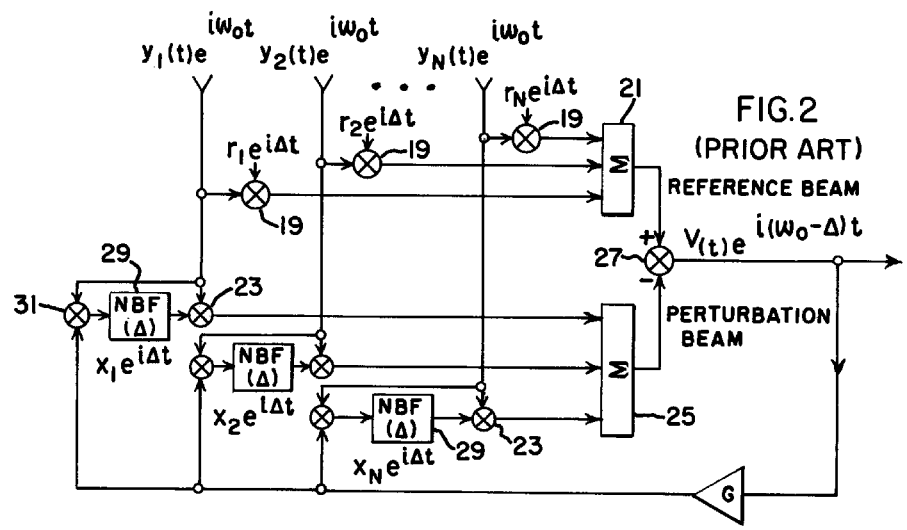
FIG. 2 is a block diagram of a processor of the kind to which the present invention has primary application.

Matched weighting is an application of this multiple sidelobe canceller principle to the phased array. The primary difference associated with this application is that the omnidirectional elements of the phased array serve as sources of both the primary channel signal and the auxiliary channel signals and no additional sensors are required. FIG. 2 illustrates such matched weighting array using feedback correlation loops similar to those of side-lobe cancellers for both beamforming and interference cancellation. Reference to FIG. 2 indicates that the composite receptor signals $\{y_k(t)\}$ are weighted in mixers 19 by a nominal of reference illumination $\{r_k\}$ and summed at 21 to form the reference beam output:

$$v_{nom}(t) = \sum_{k=1}^{N} r_k^* y_k(t) \tag{1}$$

and also weighted in mixers 23 by a perturbation illumination function $\{x_k(t)\}$ and summed at 25 to form the perturbation beam output:

$$v_{pert}(t) = \sum_{k=1}^{N} x_k^*(t) y_k(t) \tag{2}$$

The net output or residue, obtained by subtraction at 27 of the perturbation output from the nominal, is then, from equations (1) and (2):

$$v(t) = \sum_{k=1}^{N} [r_k - x_k(t)]^* y_k(t) \tag{3}$$

From equation (3) it is noted that the net weight applied to each receptor signal is the difference between the nominal and perturbation weights.

The perturbation weights, $\{x_k(t)\}$, are amplified outputs of the narrowband single-pole filters 29 satisfying the differential equations:

$$T\dot{x}_k(t) + x_k(t) = Gy_k(t)v^*(t) \qquad (4)$$

$$= G\sum_{m=1}^{N} y_k(t)y_m^*(t)[r_m - x_m(t)]; k = 1, N$$

by virtue of equation (3). If it is assumed that the narrowband filter outputs are slowly varying relative to the channel waveforms an ensemble average of equation (4) yields:

$$T\dot{x}_k(t) + x_k(t) = G\sum_{m=1}^{N} \overline{y_k(t)y_m^*(t)}[r_m - x_m(t)]; k = 1, N \qquad (5)$$

If it is further assumed that the receptor-pair correlations of the composite receptor waveforms, $\overline{y_k^*(t)y_m(t)}$, may be approximated by the correlations of just the interference, then equation (5) is equivalent to:

$$T\dot{x}_k(t) + x_k(t) = G\sum_{m=1}^{N} M_{km}^*[r_m - x_m(t)]; k = 1, N \qquad (6)$$

where $M_{km}$ is the correlation between the interference at the $k^{th}$ and $m^{th}$ array elements. The validity of this approximation is quite critical, for unless the useful signal correlations may be neglected, the matched weighting generator will attempt to suppress useful signal as well as interference.

The net elemental weights, $\{c_k(t)\}$, are given by:

$$c_k(t) = r_k - x_k(t); k=1, N \qquad (7)$$

Hence, assuming a time invariant reference illumination:

$$\dot{c}_k(t) = -\dot{x}_k(t); k=1, N \qquad (8)$$

Substitution of equations (7) and (8) into equation (6) yields:

$$T\dot{c}_k(t) + c_k(t) + G\sum_{m=1}^{N} M_{km}^* c_m(t) = r_k; k = 1, N \qquad (9)$$

Having derived a differential equation specifying each of the N weights, it is now helpful to combine them into the single matrix equation:

$$T\dot{\underline{c}} + [\underline{I} + G\underline{M}^*]\underline{c} = \underline{r} \qquad (10)$$

where $\underline{c}$=the net illumination vector with elements $\{c_k(t)\}$ $\dot{\underline{c}}$=its derivative $\underline{M}$=the interference correlation matrix with elements $\{M_{km}\}$ $\underline{r}$=the reference steering vector with elements $\{r_k\}$ The steady-state solution for the illumination function is readily seen to be:

$$\underline{c}_{ss} = \frac{1}{G}\left[\frac{1}{G}\underline{I} + \underline{M}^*\right]^{-1}\underline{r} \qquad (11)$$

and, if the product of the amplifier gain and incident waveform power is much greater than unity, this reduces to:

$$\underline{c}_{ss} = \frac{1}{G}\underline{M}^{*-1}\underline{r}. \qquad (12)$$

Hence, if the nominal weights are proportional to the useful elemental signals, the derived excitation (to within the error associated with a type zero servo system) is indeed the desired matched weighting.

The transient behavior of the net aperture weights is determined from a solution of the homogenous differential equation:

$$\dot{\underline{c}}_t + \frac{1}{T}[\underline{I} + G\underline{M}^*]\underline{c}_t = 0 \qquad (13)$$

Unfortunately the solution entails a determination of the eigenvalues of $[\underline{I}+G\underline{M}^*]$ which, in general, is quite difficult. However, one significant property of the matched weighting generator is easily established. Because the correlation matrix is positive-definite, all of the eigenvalues of $[\underline{I}+G\underline{M}^*]$ are necessarily positive and, as a consequence, the system is unconditionally stable.

There are some special situations in which an explicit solution for the transient response is readily derived. It may be shown, for example, that when the interference is composed of noise, independent from receptor to receptor, plus narrowband interference emanating from a far-field point source, the derived aperture weights approach their steady state value with the time constant $$\frac{T}{G(NP_z + P_n) + 1}.$$

Hence, the matched weighting generator "locks on" rapidly when the product of the number of array receptors and interference power level is high.

It may also be shown that when the interference is composed of noise, independent from receptor to receptor, plus multiple independent narrow-band waves emanating from point sources which are well resolved by the array, the matched weighting generator responds to each as though the others were not present. That is, so long as the array is capable of resolving the incident interference waves, it will "lock on" as rapidly to a multiplicity of sources as it will to one.

Operation of the matched weighted generator as just described requires at least derived knowledge of the background interference, independent of the useful signal, to enable distinction between them. This means that the array processor needs be able to measure the characteristics of the interference background independently of the desired signal. When the signal is a pulse-like target echo and the background is time stationary, this objective may relatively easily be accomplished simply by setting the time constant of the adaptive process too long to respond to the useful signal. The matched weighted generator then will not cancel useful signal, but will lock onto and cancel only those waveforms with high power over the averaging time of the correlation process, i.e., the interference background. Via this simple temporal discrimination, the matched weighting generator is well suited to radar and many active sonar applications.

When the interference background and signal temporal characteristics are very similar, as in the case of the passive sonar or in certain active cases in which the background time stationarity is not appreciably different from the signal pulse length, the adaptive time constants cannot be selected to respond to the background only, but would instead be proportional to both signal and background. In these cases a technique other than time constant selection is required to achieve the desired result. In accordance with the invention, a simple and direct method for preventing useful signal cancellation and "maintaining the mainlobe" has been found to be the incorporation of a spatial notch filter in the matched weighting generator to restrict the adaptive processor gain in the boresight direction.

To better explain the operation of this spatial notch filter, it will be helpful to consider again briefly the operation of the matched weighting generator of FIG. 2. Beginning with the set of net weights $c_k$ which generate the output $$\sum_{m=1}^{N} c_m^* y_m(t),$$

the input to the $k^{th}$ channel integrating filter becomes $$G \sum_{m=1}^{N} c_m y_m^*(t) y_k(t).$$

Then, assuming the integrating filters average perfectly, the $k^{th}$ channel perturbation weight is $$G \sum_{m=1}^{N} c_m \overline{y_m^*(t) y_k(t)}.$$

This weight is subtracted from the $k^{th}$ channel reference weight to form the net weight $c_k$ and the loop is completed. This exercise suggests modeling the matched weighting generator by the multiple-channel feedback system described in FIG. 3.

Figure 3:
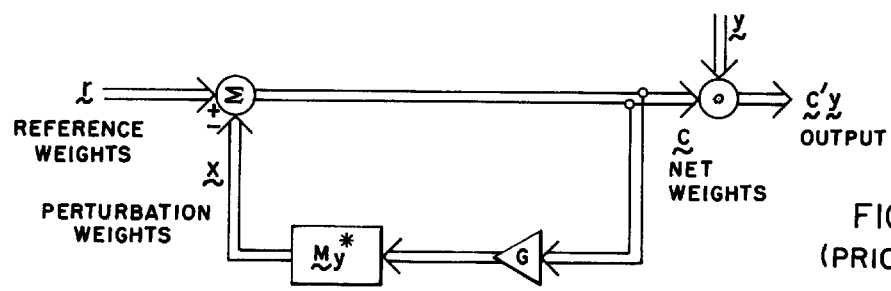
FIG. 3 is a model illustrating operation of the processor of FIG. 2.

In FIG. 3, $M_y$ is the matrix of receptor-pair waveform correlations. It will be noted that the matched weighting generator has been modeled as a multichannel servo with an angularly-dependent feedback gain. With this interpretation in mind, it is apparent that if $M_y^*$ is associated with strong, highly directional interference, the resulting weights, $c$, will have a very low response to energy incident at the angular positions of the interference. That is, the feedback gain is a maximum when the net weights are boresighted at the interference because this component of the weighting vector, i.e., this component of the forward transfer function, then is driven to a minimum.

The matched weighting generator, as modeled in FIG. 3, makes no distinction between useful signal and interference, i.e., between energy arriving from boresight (as reflected by the nominal weights $r$) and the competing energy which enters through the sidelobes of the nominal pattern. In either case, if the incident wave has high average power, the matched weighting generator will severely attenuate it. Conversely, energy incident from a particular angle will not be attenuated if the feedback transfer function responds only weakly or not at all to a weighting vector boresighted in that direction.

Figure 4:
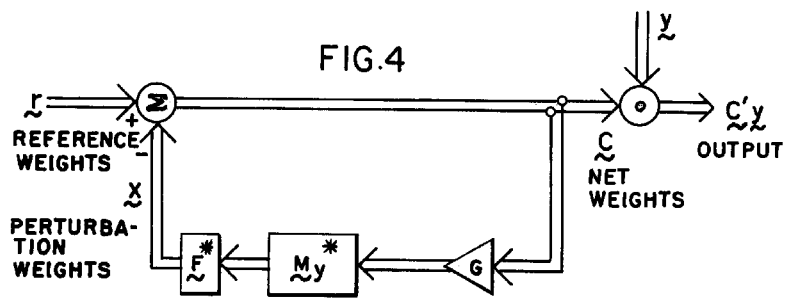
FIG. 4 is a similar model illustrating operation of a system in accordance with the invention.

In accordance with the invention, this characteristic of the feedback correlation loops is utilized to prevent useful signal suppression, by providing a notch in the feedback gain in the mainlobe direction or, more generally, in an angular sector about the desired maximum response axis. Thus modified, the matched weighting generator conforms to the model of FIG. 4, and as there shown it embodies a matrix spatial filter $F^*$ designed to have a low response or notch characteristic in the target or boresight direction. This notch filter inhibits the adaptive loop from responding to signals arriving from an angular sector about the boresight, and in this manner makes the correlation feedback loop gain directional thus allowing sidelobe interference rejection without cancellation of mainlobe signals.

Figure 5:
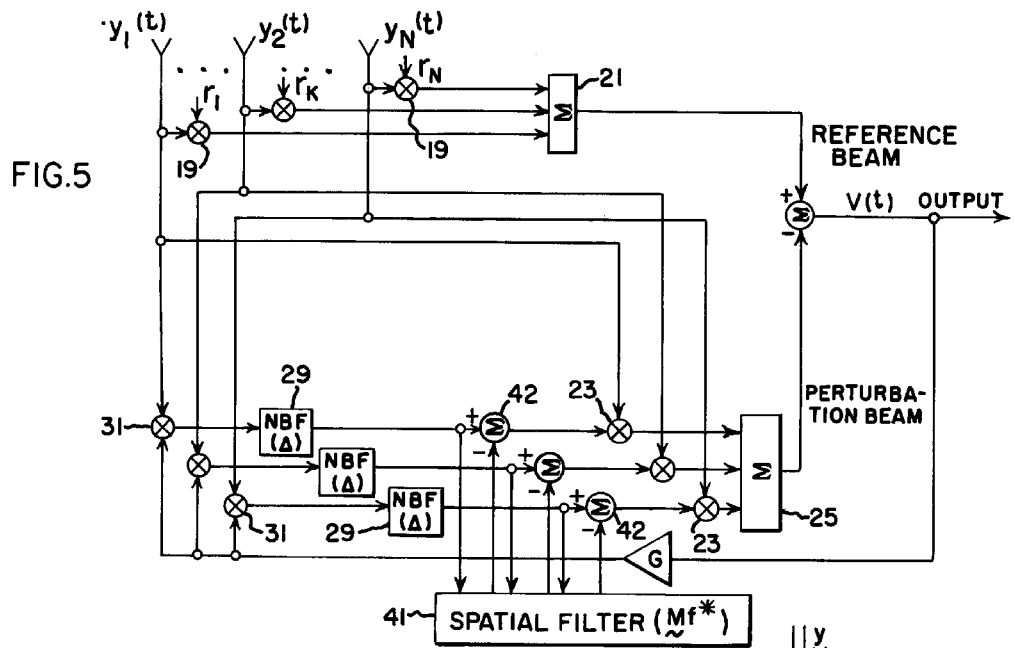
FIG. 5 is a block diagram of one implementation of the model of FIG. 4.

FIG. 5 illustrates one of several alternative arrangements by which this spatial filter may be introduced into the matched weighting generator for mainlobe maintenance as just explained. In FIG. 5, all elements of the matched weighting generator shown are similar to the corresponding elements in FIG. 2 and carry similar reference numerals, except the spatial filter 41 and the summing elements 42 which have been interposed in the feedback correlation loops so as to operate on the outputs of the narrowband integrating filters 29. This spatial filter is shown in greater detail in FIG. 6, and may there be seen to be generally similar in form to a conventional beamformer. The $x_1-x_N$ signal inputs combine in mixers 43 with a set of steering signals of any convenient intermediate frequency "f" and having stepped phase progression with a phase slope such as to center the spatial filter notch on the array boresight. These signals are summed at 45, and heterodyned back to their original frequency in mixers 47 to which the steering signal inputs are the complex conjugates of those to the mixers 43. Conveniently, the steering frequency "f" may be equal to the steering frequency "r" inputted to the mixers 19 in the reference beamformer, and may derive from the same source. The appropriate phase slope for these signals may be generated in the manner of any conventional beamformer, with phase quadrature between the signal inputs to mixers 43 and those to mixers 47.

Figure 6:
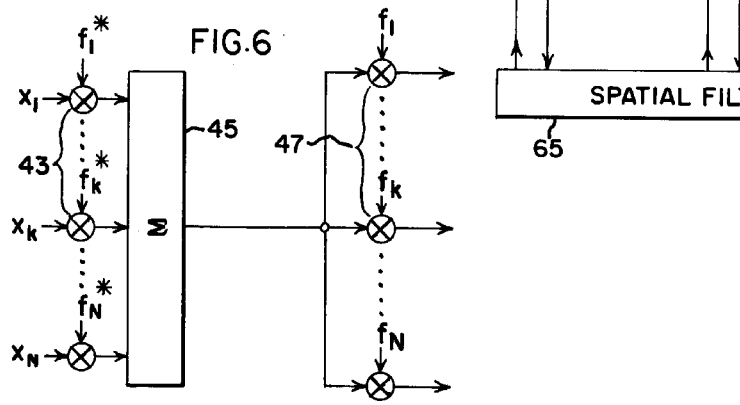
FIG. 6 is a block diagram of a spatial filter suitable for use in the processor of FIG. 5.

The spatial filter of FIG. 6 may be further simplified where it need simulate the receptor-pair covariances of only a single reference signal incident at boresight, in systems in which the receptors are initially time delay steered to boresight. In such case the signals $x_1-x_N$ may be directly summed and the difference between these signals and the sum signal directly applied to the mixers 23 with suitable amplitude weighting. The spatial notch filter thus simplified would prevent the suppression of useful signal incident squarely at boresight, though it would not prevent attenuation of useful signal arriving within, say, the 3 db points of the mainlobe but not precisely at boresight. Its use in a multiple beam surveillance system would thus require very closely spaced beams, crossing at perhaps the 1 db point, to avoid loss of useful signal.

A distributed spatial notch or properly spaced multiple notch filter enables the maintenance of the mainlobe over a broader angular region. A three-notch filter, for example, simulating reference signals incident at boresight and at each of the 1 db points of the mainlobe, allows the maintenance of a mainlobe width comparable to the uniform illumination 3 db width. Such three-notch filter may conveniently be implemented by paralleling three spatial filters as shown in FIG. 6, with the three such filters having different phase progressions each appropriate to the particular angular direction at which it is to provide mainlobe maintenance.

In the embodiment of FIG. 5 the spatial filter operates on the narrow-band integrating filter outputs within the feedback correlation loops of the perturbation beamformer. Equally effective performance could be obtained with the spatial filter located in the signal path input to the signal feedback loop correlators, there operating directly on the received signals $y_1-y_N$. However, since the bandwidth at this point is that of the input signal, the resulting spatial filter design is more complex and it accordingly will generally be preferable to locate the spatial filter as shown in the feedback correlation loops, in which the signal feedback loop bandwidth is substantially narrower and often decades narrower.

Figure 7:
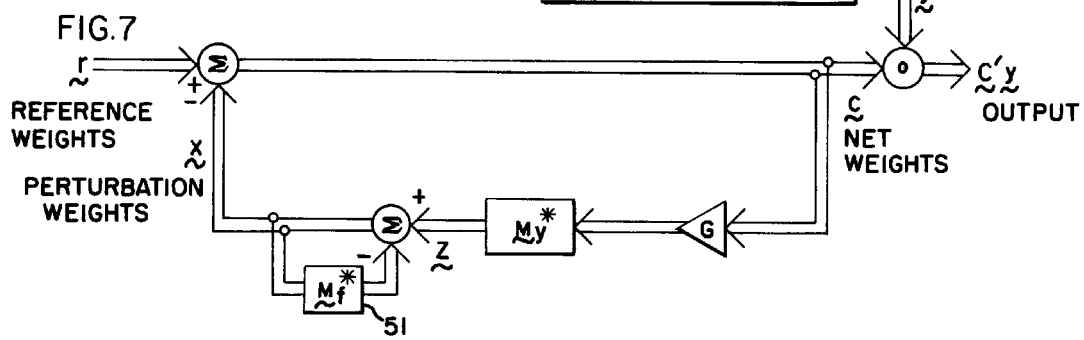
FIG. 7 is a model of an alternative embodiment of processor in accordance with the invention.

It has already been noted that a high feedback response to weights which steer the beam to boresight yields a low forward gain in that direction. As a consequence, an appropriate spatial filter $F^*$ may be readily synthesized also in a feedback configuration with the filter in a feedback loop as at 51 in FIG. 7. The spatial filter configured this way has the response $F^* = [I + M_f^*]^{-1}$ whereby the modified matched weighting generating derives the net weights:

$$c = [I + GF * M_y^*]^{-1} r \qquad (14)$$
$$= [I + M_f^* + GM_y^*]^{-1} [I + M_f^*] r$$

Figure 8:
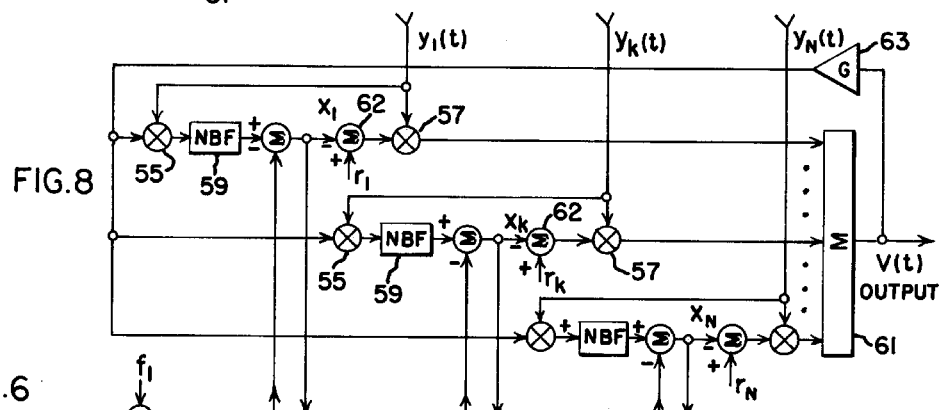
FIG. 8 is a block diagram of the processor of FIG. 7.

The circuit block diagram of the matched weighting generator modified to yield the net weights given by equation (14) is shown in FIG. 8, which illustrates also another significant change in circuit configuration from the implementation of FIG. 5. In FIG. 8 each elemental signal is weighted by the difference between nominal and perturbation weights and then combined, whereas in FIG. 5 the nominal and perturbation beams are formed first and the subtraction process follows. The two implementations are identical mathematically, but in practice one or the other of the two configurations may be clearly preferable depending upon many practical considerations.

The input signals $y_1$–$y_N$ to the processor of FIG. 8 are applied to mixers 55 within the feedback correlation loops and also to a set of mixers 57 in which they combine with the feedback correlation signals as passed by the narrowband integrating filters at 59. The outputs of mixers 57 are summed at 61 to output a signal V(t) representing useful signal content of the beam mainlobe as steered by the steering signal inputs $r_1$–$r_N$ to mixers 62. This output also is fed back through amplifier 63 to the correlation loops as shown.

The spatial filter 65 in the embodiment of FIG. 8 is in a feedback configuration and operates on the integrating filter output from filters 59. The spatial filter may be similar in arrangement and function to that of FIG. 6, and may as explained in connection with that figure comprise either single notch or multiple notch filter elements. The ratio of the spatial filter feedback loop gain to correlation loop gain should be kept high, as this allows interference cancellation with very little loss in array gain against independent noise even in the presence of multiple interference sources. Such desired relationship of loop gains may be accomplished by selection of scale factors in the loop design.

All the elements in an array need not be individually controlled to realize most of the gain available from adaptive processing, and often significant benefits may be realized at substantially lower cost by applying adaptive processing to only some of the array elements. Alternatively, the elements of an array can be conventionally beamformed in groups or subarrays, and each of the subarrays then adaptively beamformed to control the full beam. In sonar applications, for example, such subarrays may take the form of staves and, where azimuthal control is sufficient, a beamformer operating on vertical staves would provide a relatively simple mechanization with good immunity to mutual interference between ships and to self-interference from reverberation in adjacent transmit sectors.

From the foregoing it will be apparent that the addition of a spatial notch filter or a plurality of such filters to an adaptive beamformer in any of the several alternative arrangements described serves to extend the usefulness of the basic adaptive beamforming configuration, for radar, sonar and other receiving systems, to applications where temporal discrimination between interference and useful signal is not possible. While in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. In combination with an array of wave receptors, an adaptive array beamformer comprising primary beamformer means for phase and amplitude weighting the elemental signals of said array with nominal weights so as to form and direct a beam mainlobe to the angle of desired maximum response of the array, auxiliary beamformer means for deriving perturbation weights from said elemental signals and for phase and amplitude weighting said signals with said perturbation weights so as to form and direct a null to the angle of arrival of interference, and mainlobe maintenance means including spatial notch filter means for inhibiting the operation of said auxiliary beamformer means upon approximate coincidence of the angle of said null with that of desired maximum response of the array.

2. An array beamformer as defined in claim 1 including means for weighting each of said elemental signals with the difference between said nominal and perturbation weights for that signal and then combining the signals thus weighted to form said beam mainlobe and null.

3. An array beamformer as defined in claim 1 including means for applying said perturbation weights to said elemental signals to form a perturbation beam and for subtracting said perturbation beam from the beam formed and directed by said nominal weights to thus form said null.

4. An array beamformer as defined in claim 1 wherein said spatial notch filter means comprises a plurality of filters each providing a notch spatially adjacent to but not coincident with the others to thereby inhibit the operation of said auxiliary beamformer over a relatively broad angular region about the angle of desired maximum response of the array.

5. An array beamformer as defined in claim 1 wherein said beamformer means comprises a plurality of feedback correlation loops each having as inputs the beamformer output and one of said elemental signals and being operative to generate one of said perturbation weights and to produce an output signal weighted thereby.

6. An array beamformer as defined in claim 5 wherein said feedback correlation loops are closed through said spatial notch filter means and are disabled thereby against generation of perturbation weights such as would place said null at said angle of desired maximum response of the array.

* * * * *